United States Patent [19]

Burns

[11] Patent Number: 4,685,296

[45] Date of Patent: Aug. 11, 1987

[54] OCEAN WAVE ENERGY CONVERSION USING PIEZOELECTRIC MATERIAL MEMBERS

[76] Inventor: Joseph R. Burns, 6 Baldwin Ct., Pennington, Mercer County, N.J. 08534

[21] Appl. No.: 887,222

[22] Filed: Jul. 21, 1986

[51] Int. Cl.⁴ .............................................. F03B 13/12
[52] U.S. Cl. ........................................ 60/497; 290/53
[58] Field of Search ............................. 290/53; 60/497

[56] References Cited

U.S. PATENT DOCUMENTS 971,343  9/1910  Barr ........................................ 60/497
4,076,463  2/1978  Welczer ............................ 60/497 X Primary Examiner—Allen M. Ostrager
Attorney, Agent, or Firm—Michael Y. Epstein

[57] ABSTRACT

A float on a body of water is mechanically coupled to a piezoelectric material member for causing alternate straining and destraining of the member in response to the up and down movement of the float in response to passing waves, thereby causing the member to generate electricity. The output impedance of the float is matched to the input impedance of the member for increasing the energy transfer from the float to the member.

5 Claims, 3 Drawing Figures

OCEAN WAVE ENERGY CONVERSION USING PIEZOELECTRIC MATERIAL MEMBERS

BACKGROUND OF THE INVENTION

This invention relates to obtaining electrical energy from surface waves on bodies of water using piezoelectric material members.

The use of piezoelectric members for converting the mechanical energy of surface waves of bodies of water to electricity is generally known, see, for example, U.S. Pat. Nos. 4,110,630 and 4,317,047. These known arrangements however, are quite impractical owing to poor utilization of the piezoelectric members, whereby only relatively small amounts of electrical power, at a relatively high cost, are obtained.

The present invention makes far better use of the piezoelectric material members, both in the efficiency of the energy conversation process and in the simplicity and low cost of the arrangements used.

SUMMARY OF THE INVENTION

For increasing the efficiency of the energy conversation process, an energy transfer arrangement is provided in which the output impedance of the system used to extract and transfer energy from the waves is made to be substantially equal to the input impedance of the piezoelectric member. In one embodiment of the invention, the wave energy extraction system comprises a float for up and down movement in response to the surface waves, the float being mechanically coupled to a piezoelectric member for alternately straining and de-straining the member in direct response to the movement of the float. The impedance of the float is equal to the product of the area of the float at the surface of the water and the density of the water. The impedance of the piezoelectric member is equal to the product of Young's modulous of elasticity for the member and the cross-sectional area of the member in a direction perpendicular to the float-induced strain therein, divided by the length of the member in the direction of strain. The dimensions of the float and the piezoelectric member are selected such that the output impedance of the float (in this embodiment), as well as the output impedance of the mechanical coupling means, are equal to the input impedance of the member.

In a preferred embodiment, a mechanical frequency converter is disposed in the coupling betweeh the float and the piezoelectric member for increasing the frequency of the electrical output from the member.

DETAILED DESCRIPTION

Figure 1:
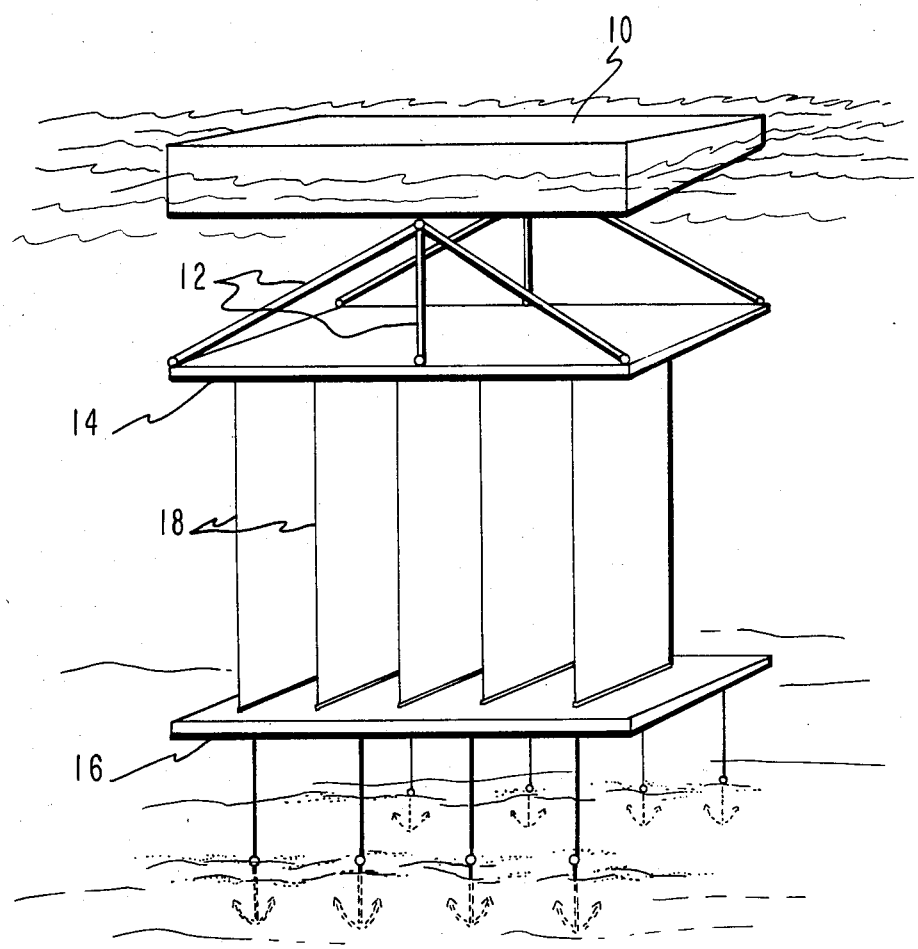
FIGS. 1–3 show, schematically, different energy conversion arrangements in accordance with this invention.

It is known that maximum efficiency of coupling of energy from a first to a second system occurs when the output impedance of the first system equals the input impedance of the second system. To my knowledge, however, this known relationship has not been considered or utilized in connection with the transfer of energy from surface waves on bodies of water to piezoelectric members.

The impedance (Z, e.g.. expressed in newtons/meter) of a mechanical system is defined by the inverse ratio of the displacement (D) caused by an applied force (F), or $$Z = \frac{F}{D} \tag{1}$$

The impedance for water can be expressed as follows:

$$F_w = \rho \cdot A \tag{2}$$

where the subscript w refers to the water, $\rho$ is the density of the water. e.g., in newtons/meter$^3$, and A is the cross-sectional area of a volume of water which is displaced by an applied force. The basis for this equation can be understood as follows. An object having a volume V immersed in a body of water will experience an upward force thereon equal to the weight of the displaced volume V of water. Thus, the force associated with the water displacement equals the density of the water times its volume. For a unit block of water, this can be experienced as:

$$F_w = \rho \cdot A \cdot H \tag{3}$$

where A is the cross-sectional area of the unit and H is the height of the unit. If it is assumed that all the displacement occurs along the H direction, hence a total dislacement equal to H, the impedance of the unit block of water can be expressed as:

$$Z_w = \frac{\rho \cdot A \cdot H}{H} = \rho \cdot A \tag{4}$$

as above noted.

Turning next to the piezoelectric member used to generate the electricity, it is noted that a piezoelectric material is one which generates a voltage in direct proportion to the strain induced therein. The impedance of any strained body can be expressed as follows:

$$Z = Y \cdot \frac{A}{L} \tag{5}$$

where Y is Young's modulous of elasticity for the body, A is the average cross-sectional area of the body in a direction perpendicular to the induced strain, and L is the length of the body in the strain direction.

The maximum efficiency of energy coupling between a wave and a piezoelectric member is achieved if the output impedance of the wave is equal to the input impedance of the means used to extract and transfer energy from the wave, and if the output impedance of the latter means is equal to the input impedance of the piezoelectric member. In accordance with this invention, this is acheived as follows.

The means used to extract energy from the surface waves comprises simply a member floating on the surface of the body of water.

The impedance of a float is exactuly the same as that of the surface waves. This follows because the weight of the float (which equals the force necessary to displace it in the vertical direction) is exactly equal to the weight of the volume of water displaced thereby, whereby the wave induced force on the float is exactly the same force associated with the waves. Also the vertical displacement of the float is equal to that of the waves (subject, however, to a restriction on the float size relative to the wavelengths of the waves, such restriction being hereinafter described). Thus the impedance of the float can be expressed as $$Z_f = A_f \rho \quad (6)$$

where the subscript "f" refers to the float.

If a rigid member is used to couple the vertical movement of the float directly to the piezoelectric member, both the input and output impedance of the energy transfer means is equal to that of the float. Thus, to achieve maximum efficiency coupling of the energy transferred from the float to a piezoelectric member via such a rigid transfer means, it is necessary that the input impedance of the piezoelectric member equal the impedance of the float, that is, that the following relationship be satisfied:

$$A_f \cdot \rho = Y_p \cdot \frac{A_p}{L_p} \quad (7)$$

where the subscript "p" refers to the piezoelectric member.

Calculations show that, in a system satisfying equation (7), the energy coupling between a wave driven float and a piezoelectric member directly driven by the float can be as high as 25%. This is far higher than the efficiency of energy conversion in prior known wave-piezoelectric member systems.

Any number of arrangements can be designed for providing the optimum coupling relationship specified by equation (7). Possibly the simplest arrangement is shown in FIG. 1.

In FIG. 1, a float 10 is shown on the surface of a body of water (e.g., an ocean), and the float 10 is connected by relatively rigid members 12, e.g., solid metal bars, to a flat top plate 14. Suspended from the top plate 14 and connected to a bottom 16, which is itself anchored to the ocean floor, are a number of members 18 of a pieoelectric material.

The members 18 can be of any number of piezoelectric materials, but the presently preferred material is a commercially available plastic polymer, polyvinyl fluoride (PVF$_2$), which is available in sheet form. This material is of the transversal type, i.e., a voltage is generated between the two major surfaces of the sheet which are parallel to the direction of strain of the sheets. Electrodes (e.g., thin platings of metal) are disposed on each of these surfaces by means of which the voltages generated in each sheet, and the accompanying electrical power, can be collected. The electrodes of each sheet are connected in parallel to a common cable (not shown) for collecting and distributing the electrical power generated by the array of sheets 18.

Preferably, the vertical dimensions of the various members are selected such that when the float is in its rest position (i.e., floating on a waveless surface), the sheets 18 are in tension to provide some degree of strain. Accordingly, as the float moves up and down in response to passing waves, the strain on the sheets 18 is alternately increased and decreased, thereby converting the mechanical energy derived from the float directly into electrical energy.

The dimensions of the float 10 and the array of sheets 18 are selected to satisfy equation (7) to obtain the maximum efficiency of power conversion.

For example, assume a float 10 having an area ($A_f$) of 100 m$^2$. The density of sea water is approximately $10^4$ newtons/m$^3$. The impedance (Z) of the float ($\rho \cdot f$) is thus $10^6$ newtons/meter.

Sheets of PVF$_2$ are commercially available with a thickness of $10^{-3}$m. Assuming sheets 18 having a width of 10 m, the cross-sectional area A of each sheet is $10^{-2}$. Young's modulus (Y) for the material is $3 \times 10^9$ newtons/m. Equation (7) can be rearranged as $$L_p = \frac{Y_p \cdot A_p}{n \cdot Z_p} \quad (8)$$

where n equals the number of sheets 18 used (the total area of the array of sheets being n times the area of each sheet), or $$L_p = \frac{3 \times 10^9 \times 10^{-2}}{n \, 10^6} = \frac{30}{n} \text{ meters.} \quad (9)$$

If 10 sheets are used, the length of each sheet is 3 meters. Clearly, great flexibility is available in the design of the arrangement used.

As noted, efficiencies as high as 25% can be obrained in the energy transfer between the float and the array of members 18. The actual electrical energy output from the array of members 18 is also a function of the mechanical-to-electrical conversion efficiency of the prezoelectric material used. For PVF$_2$ material, the conversion efficiency is around 1½%.

Various modifications of the invention are now described.

Figure 2:
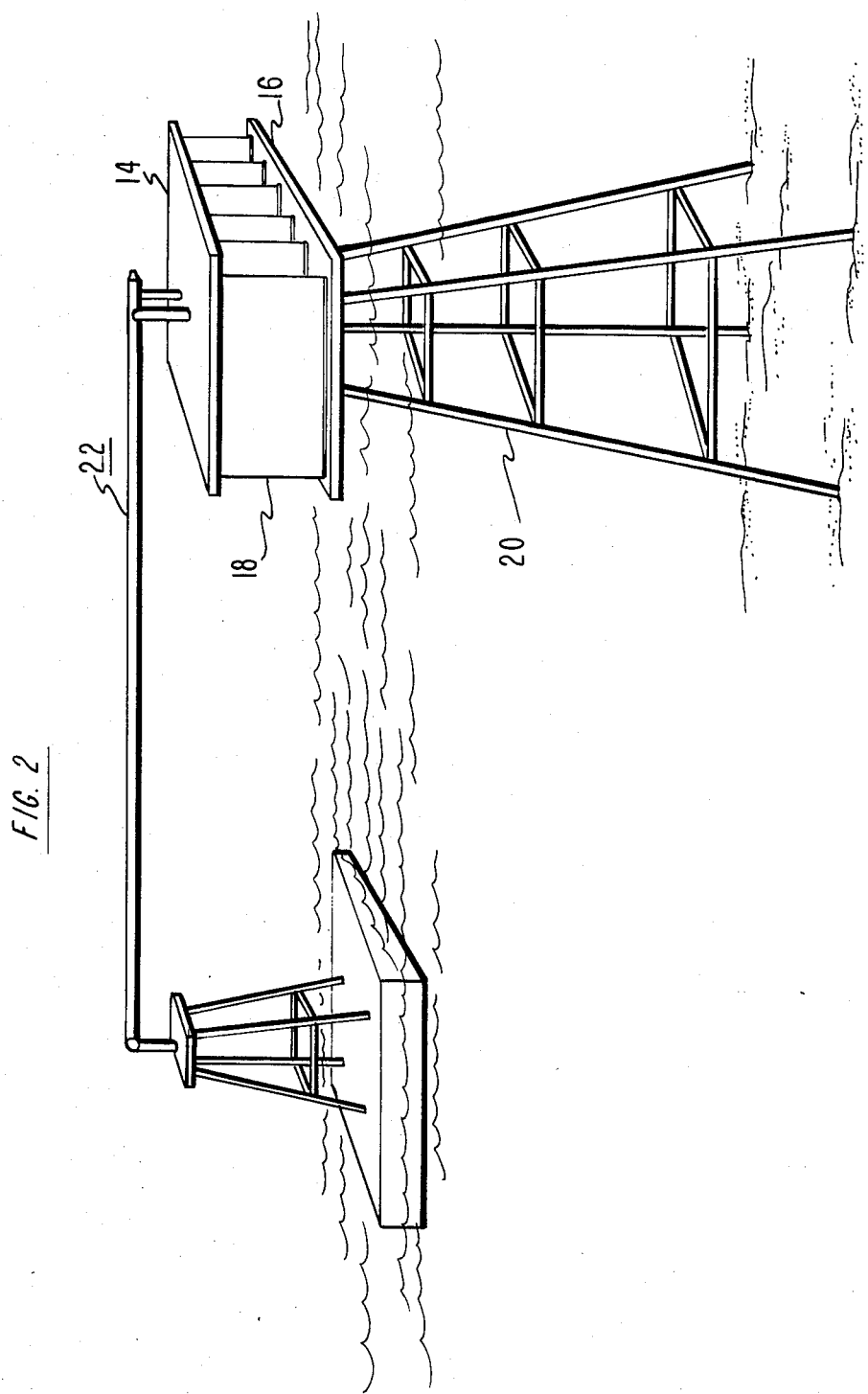

The array of members 18 need not be disposed beneath the float 10. Rather, to prevent immersion of the members 18 in the water, and the problems attendant thereto, the members 18 can be mounted on, for example, a fixed platform or tower 20 which extends above the water surface, such as shown in FIG. 2. In this arrangement, a tower and boom arrangement 20 is used to mechanically couple the float movement to the array of members 18.

Surface waves on large bodies of water have a relatively low frequency, in the order of 0.1 Hz. With a mechanical coupling between the float and the piezoelectric members 18 providing a one to one correspondence between the rise and fall of the float and the alternate straining and de-straining of the members 18, the frequency of the electrical output of the members corresponds to that of the passing waves. In certain instances, it is desirable to generate electrical power at a higher frequency, e.g., 60 Hz. This can be accomplished by means of a mechancial frequency multiplier disposed in the path of energy transfer from the float to the piezoelectric material members.

Various means suitable for accomplishing this are known. For example, a crank mechanism (not illustrated) dependent from the end of the boom 20 (FIG. 2) can be used to convert the vertical linear motion of the boom to rotary motion of a flywheel mounted on the tower. The flywheel, in turn, drives gears and a further crank mechanism for converting the rotary motion back to linear motion for alternately straining and de-straining the piezoelectric members, but at a greater stroke (frequency) rate.

The output impedance of such a frequency multiplying, energy transfer system is the ratio of the force delivered by the reciprocating member to the piezoelectric members divided by the displacement of the reciprocating member. The parameters of the piezoelectric members are selected to match this output impedance. Considering such a system, equation 7 is modified as follows:

$$A_f \cdot \rho = Y_p \frac{A_p \cdot D_r}{L_p \cdot D_f} \quad (10)$$

where $D_r$ and $D_f$ are the displacements of the reciprocating member and the float, respectively.

A further advantage of the last described arrangement is that the displacement or strain of the piezoelectric material can be significantly reduced in comparison with the vertical displacement of the float. This makes it easier to accommodate large variations in the displacement of the float, with different height waves, with reduced risk of exceeding the elastic strain limit of the piezoelectric material member. This is particularly desirable with the FIG. 2 embodiment for minimizing the height of the various structures above the surface of the ocean.

An important factor earlier referred to is the size of the float relative to the wavelengths of the surface waves. If the float is too long in the direction of travel of the waves, different portions of the float can be simultaneously displaced in different directions, thereby reducing the net force on the float, hence the energy transferred from the float. This is referred to as the "cancellation effect". For example, if the float has a length in the direction of wave travel exactly equal to one wavelength of the surface waves, at certain times, one half of the float will be elevated above the water, while the other half is depressed below the water surface, thereby resulting in a zero net force on the float.

Figure 3:
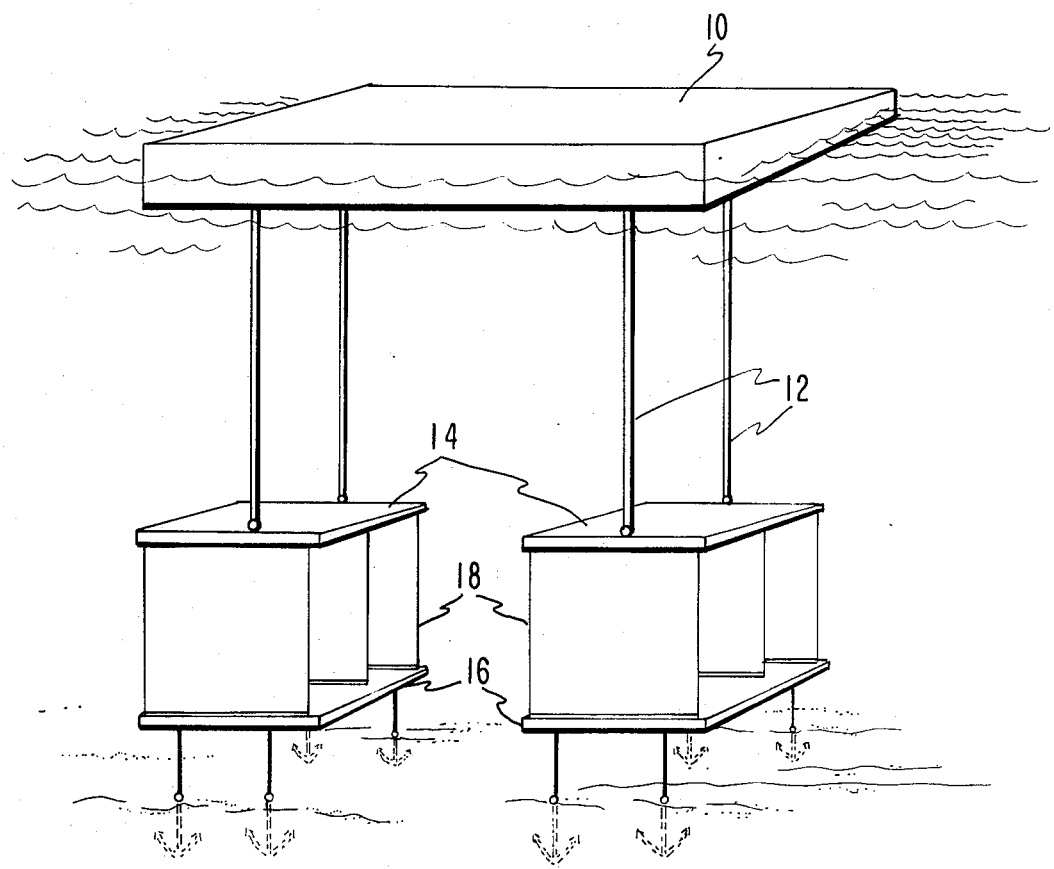

One solution is to use (with such a dimensioned float) each float half in connection with a separate piezoelectric material element, as shown in FIG. 3. To satisfy equation (7) in the FIG. 3 embodiment, the area $A_f$ is taken as one-half the total area of the float. In general, and aside from cancellation effect considerations, a single float can be used to drive a number n of separate piezoelectric members, in which case the area of the float is divided by n to satisfy equation (7) in the design of each piezoelectric member.

To avoid the cancallation effect, I have determined that if the dimension of the float in the direction of the waves is less than a specified percentage of the wavelength of the waves, such specified percentage being a function of the shape of the float at the water surface, the cancellation effects are relatively minimum. Thus, for example, if the float has a rectangular shape, the length of the dimension of the float in the direction of wave travel should be less than about 50% of the wavelength of the waves. If the float has a circular shape, the diameter of the float should be less than about 35% of the wavelengths. Because the average wavelength of ocean waves is about 150 meters, quite large floats can still be used while satisfying the aforementioned dimensional limitations. Also, for a rectangular shaped float, the dimension in the direction perpendicular to the direction of the waves can be as long as desired.

With a rectangular shaped float, known means, e.g., dependent fins or the like, are necessary to maintain the float in proper orientation with respect to the direction of wave travel. This, in turn, requires the use of means, such as a track arrangement, to allow relative movement between the float and the boom structure 20 (FIG. 2) to maintain the boom disposed above the fixed tower 30.

An advantage of a circular shaped float is that no means need be utilized to maintain the orientation of the float with respect to the direction of the waves. Thus, the float can be anchored in fixed orientation relative to the tower 30.

It is noted, however, that while cancellation effects are preferably taken into consideration in the design of a system, the aforementioned maximum dimensions are not critical. This is because different wavelength waves are likely to be encountered over periods of time, and the variation of output power with float dimension in the direction of wave travel (for given wavelength waves) is a smooth rather than an abrupt function.

What is claimed:

1. Apparatus for converting mechanical energy from surface waves on a body of water to electrical energy comprising a float for up and down movement in response to the waves, a prezoelectric member for converting strains thereof to electrical energy, and energy transfer means for coupling the up and down movement of said float to said member for causing alternate straining and de-straining thereof, the ouput impedance of said energy transfer means being equal to the input impedance of said member.

2. The apparatus of claim 1 in which the output impedance of said float equals the output impedance of said energy transfer means.

3. The apparatus of claim 2 in which the up and down movement of the float causes a corresponding change in the strained dimension of said member.

4. The apparatus of claim 1 in which said energy transfer means includes a frequency converter for increasing the frequency of the alternate straining and de-straining of said member.

5. The apparatus of claim 1 in which the length of the dimension of the float parallel to the direction of wave movement is less than 50% of the wavelength of the average waves on said body of water.

* * * * *